United States Patent [19]
Barker et al.

[11] Patent Number: 6,052,819
[45] Date of Patent: Apr. 18, 2000

[54] SYSTEM AND METHOD FOR DETECTING CORRECTING AND DISCARDING CORRUPTED DATA PACKETS IN A CABLE DATA DELIVERY SYSTEM

[75] Inventors: James E Barker, Lawrenceville; Roy A. Bowcutt, Alpharetta; Scott E. Hrastar, Duluth; Todd A. Merrill, Alpharetta; David A. Sedacca, Atlanta, all of Ga.

[73] Assignee: Scientific-Atlanta, Inc., Norcross, Ga.

[21] Appl. No.: 08/835,966

[22] Filed: Apr. 11, 1997

Related U.S. Application Data

[60] Provisional application No. 60/035,618, Jan. 17, 1997.

[51] Int. Cl.[7] .................................................. H03M 13/00
[52] U.S. Cl. ........................ 714/776; 714/752; 370/469; 370/473; 370/476
[58] Field of Search ................................ 348/12; 370/77, 370/404, 469, 473, 474, 475, 476; 714/776, 752

[56] References Cited

U.S. PATENT DOCUMENTS

| | | | |
|---|---|---|---|
| 4,712,214 | 12/1987 | Meltzer et al. | 714/748 |
| 5,239,540 | 8/1993 | Rovira et al. | 370/77 |
| 5,347,304 | 9/1994 | Moura et al. | 348/12 |
| 5,426,652 | 6/1995 | Heiman | 714/752 |
| 5,586,121 | 12/1996 | Moura et al. | 370/404 |
| 5,805,596 | 9/1998 | Kranzler et al. | 370/445 |

*Primary Examiner*—Emmanuel L. Moise
*Attorney, Agent, or Firm*—Kenneth M. Massaroni; Hubert J. Barnhardt III; Kelly A. Gardner

[57] ABSTRACT

A method for transporting digital data from a sender to a receiver in a system where the digital data is broken into data packets for transmission over radio frequency channels, each data packet including forward error-correcting code, the method comprising the steps of receiving the data packets at the receiver; reconstructing the data packets to the digital data, the forward error-correcting code for fixing corrupted data packets; and halting the data packet reconstructing step if a data packet is uncorrectable.

10 Claims, 10 Drawing Sheets

SYSTEM AND METHOD FOR DETECTING CORRECTING AND DISCARDING CORRUPTED DATA PACKETS IN A CABLE DATA DELIVERY SYSTEM

CROSS-REFERENCE TO RELATED APPLICATIONS

This application claims priority to co-pending U.S. Provisional Patent Application Ser. No. 60/035,618, entitled "Cable Data Network System" for R. Bowcutt et al., filed Jan. 17, 1997.

This application further relates to co-pending U.S. patent application Ser. No. 08/833,198, now pending entitled "Apparatus and Methods for Automatically Rerouting Packets in the Event of a Link Failure" for R. Bowcutt, S. Hrastar, and T. Merrill; U.S. patent application Ser. No. 08/837,073, now pending entitled "Method of Using Routing Protocols to Reroute Packets during a Link Failure" for R. Bowcutt, S. Hrastar, and T. Merrill; U.S. patent application Ser. No. 08/843,061, now pending entitled "Methods for Dynamically Assigning Link Addresses and Logical Network Addresses" for S. Hrastar and G. Smith; U.S. patent application Ser. No. 08/843,056, now pending entitled "Router which Dynamically Requests a Set of Logical Network Addresses and Assigns Addresses in the Set to Hosts Connected to the Router" for S. Hrastar and M. Schutte; U.S. patent application Ser. No. 08/838,833, now pending entitled "Router for Use with a Link that has a Set of Concurrent Channels" for R. Bowcutt, S. Hrastar, T. Merrill, and M. Schutte; U.S. patent application Ser. No. 832,714, now pending entitled "Method of Dynamically Assigning a Logical Network Address and a Link Address" for S. Hrastar and D. Sedacca; U.S. patent application Ser. No. 08/840,304, now pending entitled "Router for which a Logical Network Address which is not Unique to the Router is the Gateway Address in Default Routing Table Entries" for S. Hrastar and G. Smith; U.S. patent application Ser. No. 08/835,917, now pending entitled "Usage Statistics Collection for a Cable Data Delivery System" for R. Bowcutt and S. Hrastar; and U.S. patent application Ser. No. 08/835,916, now pending entitled "Two-Tiered Authorization and Authentication for a Cable Delivery System" for S. Hrastar; all the above applications are concurrently filed herewith.

BACKGROUND OF THE INVENTION

1. Technical Field

The present invention generally relates to the field of cable data delivery systems and, more particularly, to a system and method for detecting, correcting and discarding corrupted Internet Protocol ("IP") packets in a cable data delivery system.

2. Description of Related Art

How Information Travels Across the Internet

The Internet is a series of inter-connected networks which facilitate the exchange of information, data, and files. Users connected to the Internet have access to the vast amount of information on these networks. A typical way of getting access to the Internet is through an online service server. Referring to FIG. 1, networks 110, 112, and 114 are connected to Internet 100 via online service servers 120, 122, and 124, respectively. The networks may be connected in many different ways, for example, network 114 is connected in a token ring while networks 110 and 112 are connected as Ethernet® networks. Another way of getting access to the Internet is through a dial-in Internet provider. For example, a user on his personal computer ("P.C.") 158 may access Internet 100 by dialing in to Internet provider 150 using his modem 152. Routers, which connect computers and networks, direct traffic in a network and on the Internet. Routers 160, 162, 164, and 166 examine packets of data that travel across the networks and the Internet to determine where the data is headed. Based on the data's destination, it routes it the most efficient way—generally to another router, which in turn sends it to the next router, and so on.

How TCP/IP Works

The Internet is a packet-switched network, that is, there is no single, unbroken connection between sender and receiver. Instead, when information is sent, it is broken into small packets, sent over many different routes at the same time, and then reassembled at the receiving end. Each packet is sent independently of one another through a series of switches or routers. Once all the packets arrive at the receiving end, they are recombined into their original, unified form. Two protocols are involved in breaking the data into packets, routing it across the Internet, and then recombining them on the other end: the Internet Protocol ("IP"), which handles the routing of the data; and the Transmission Control Protocol ("TCP"), which handles breaking the data into packets and recombining the packets on the receiving end.

TCP operates by taking data and breaking it up into packets. Each packet is given a header which contains a variety of information, such as in what order the packets should be assembled with other related packets. As TCP creates each packet, it also calculates and adds to the header a checksum, which is a number that TCP uses on the receiving end to determine whether any errors have been introduced into the packet during transmission. The checksum is based on the precise amount of data in the packet.

As the packets arrive at their destination, TCP calculates a checksum for each packet. It then compares this checksum with the checksum that has been sent in the packet. If the checksums do not match, TCP knows that the data in the packet has been corrupted during transmission. It then asks that the original packet be retransmitted. When all the noncorrupt packets are received, TCP assembles them into their original, unified form. See Preston Gralla, *How the Internet Works*, Ziff-Davis Press (1996), which is hereby incorporated by reference into this patent application.

Connecting to the Internet Using Cable Modems

As discussed above, there are many different ways to connect to the Internet, including connecting through local area networks ("LANs"), dial-in connections, cable modems, and special high-speed ISDN (Integrated Services Digital Network) lines. Cable modems may be used to access the Internet using coaxial cables that carry television signals. An advantage of using cable modems is cable modems may send and receive data at speed from 20 to 100 times faster than conventional modems.

Cable television ("CATV") transmission systems have been utilized since the 1980's for the transmission of data, point-to-point at T1 carrier rates of 1.544 Mbps in a CATV system environment. Scientific-Atlanta, Inc. introduced and marketed a product known as the Model 6404 Broadband Data Modem in the early 1980's. Two users, coupled to a CATV distribution network having a 0–54 MHz upstream or reverse path and a typical downstream path at frequencies above this range, can communicate with each other or with a telephone central office. The upstream and downstream channels are spaced at approximately 750 kHz spacing; the modulation scheme is 16-QAM. Each of two parties coupled to the CATV distribution network can communicate with each other, each having an upstream and a downstream radio frequency path. A Model 6440 frequency translator translates the upstream channel path frequency to the downstream channel path frequency for each party as necessary. Up to 24 voice or data telecommunication channels are provided by such equipment.

Data transmission services including digital audio services were also pioneered by Scientific-Atlanta, Inc. U.S. Pat. No. 5,239,540 describes a digital data delivery service for, for example, digital audio, game or software delivery to the home using quadrature partial response ("QPR") modulation. Also, Scientific-Atlanta, Inc. has recently applied for U.S. Patents in the field of data network access devices, for example, cable modems. These include U.S. patent application Ser. No. 08/627,062, filed Apr. 3, 1996, now U.S. Pat. No. 5,790,806, Ser. No. 08/732,668, filed Oct. 16, 1996, now U.S. Pat. No. 5,966,163, and U.S. patent application Ser. No. 08/818,037, entitled "System and Method for Providing Statistics for Flexible Billing in a Cable Environment" for Koperda et al., filed Mar. 14, 1997. The above applications describe the problem of providing multiple tiers or levels of service in a new combined telecommunications/CATV environment. These applications are hereby incorporated by reference into this patent application.

U.S. Pat. Nos. 5,347,304 and 5,586,121 describe an asymmetric network in which one path to a computer or work station is via a cable network such as a CATV network and the other path is via the telecommunications network. The '121 patent describes a network manager which handles or controls the forward (downstream) and return (upstream) communication paths to establish interactive full-duplex real-time network sessions between a host and a selected client device. Connection to the network is managed based on parameters such as the amount of times a device's channel requests have gone unfulfilled. The upstream channels are assessed as to quality based upon error rates, noise floor and signal-to-noise ratio. Channel quality monitoring for errors and signal-to-noise ratio is done transparently to the user and the applications. A failure in periodic upstream "heartbeat" messages at selected time intervals can indicate an upstream channel failure and necessitate a channel reassignment. These applications, however, do not appear to discuss data packet reconstruction.

Despite the several improvements in the art of providing cable data delivery services in recent years, there remains an opportunity to improve the processing of IP packets in a cable data delivery system. In particular, there exists a need for a method and apparatus for detecting, correcting and discarding corrupted IP packets in a cable data network.

SUMMARY OF THE INVENTION

A cable data network of the present invention provides a protected radio frequency link as the connecting link between a service provider and an Internet subscriber. The protected radio frequency link provides forward error correction for the data link layer blocks (packet blocks) of an IP packet or datagram which protects the final link from the service provider to a cable modem and, in turn, protects the link to the Internet subscriber. In particular, forward error correction of each packet block is performed using forward error correction redundancy to enhance performance in the presence of channel impairment. The protected radio frequency link replaces and overcomes the drawbacks of the usually noise intensive and destructive telephone line connecting the service provider and the Internet subscriber.

Moreover, the cable modem of the present invention provides detection and elimination of incomplete IP packets in a cable data network. This allows maximum processing and resource efficiency by eliminating the processing of corrupted or incomplete IP packets. For example, once a packet block of an IP packet has been identified as unrecoverable, further processing of the entire IP packet is halted. In other words, as soon as a block is found to be uncorrectable or unrecoverable, subsequent blocks constituting the same IP packet are not processed and the incomplete IP packet is flushed from memory. This minimizes CPU resources and maximizes memory utilization in a cable modem in the presence of data errors.

The above features and advantages of the present invention will be better understood from the following detailed description taken into conjunction with the accompanying drawings.

DETAILED DESCRIPTION

The following Detailed Description will begin with an overview of the IP packets (datagrams) and the IP addressing architecture employed in the cable data network of the preferred embodiment. The Detailed Description will then describe the physical components of the cable data network of the preferred embodiment. Thereupon the discussion will show how a cable modem of the present invention provides detection, correction and elimination of incomplete IP packets in the cable data network.

Internet Protocol Packets (Datagrams)

Figure 1:
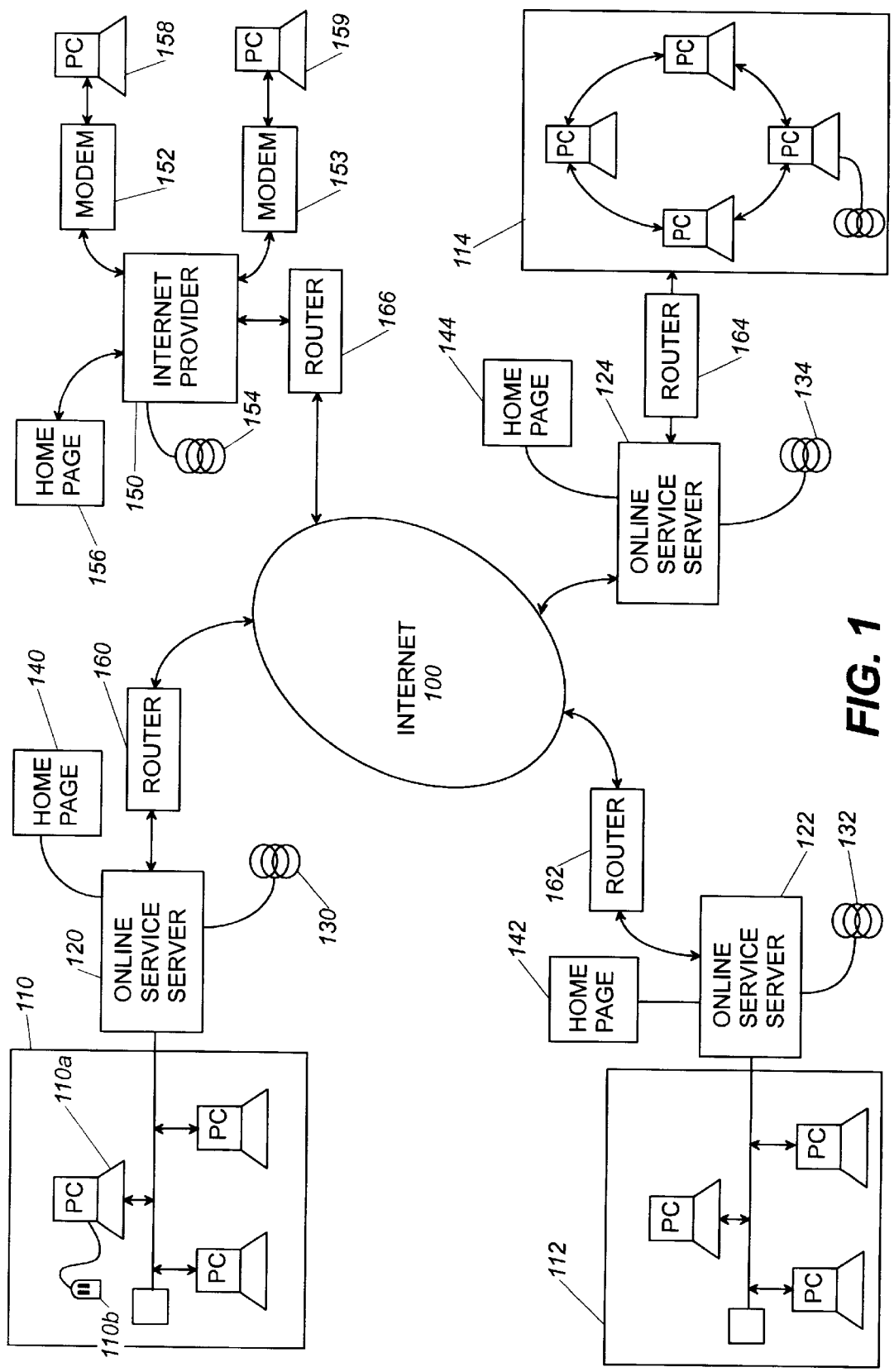
FIG. 1 illustrates how computers and networks are interconnected on the Internet.
Figure 2:
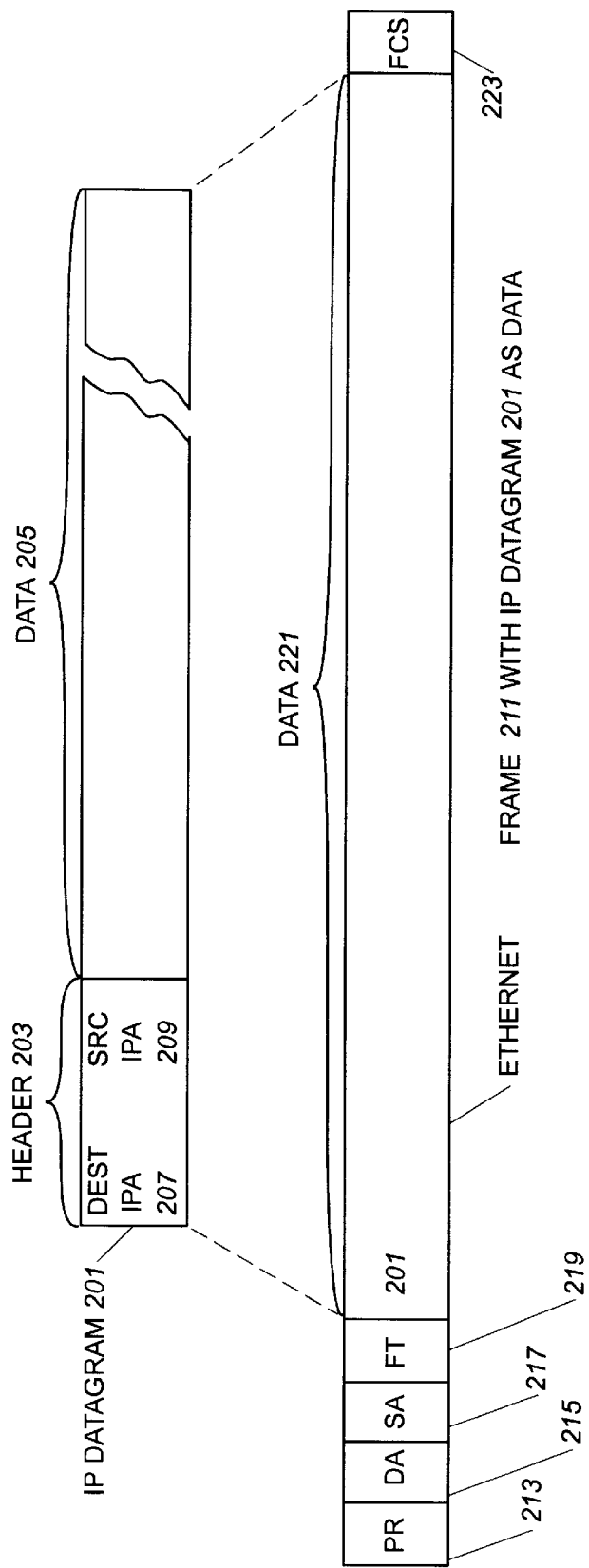
FIG. 2 is an exploded drawing showing the interrelationship between an IP packet or datagram and an Ethernet frame where the IP packet or datagram becomes the data field of the Ethernet frame.

Referring to FIG. 2 there is shown an IP packet or datagram 201 that are required to understand the following discussion. IP packet and datagram are interchangeably used herein. An IP packet 201 has two main parts, a header 203, which carries control information about the IP packet, and data 205, which is the data being transported in the IP packet. Header 203 has a fixed format and length, while data 205 may have a varying length. All that need be known about the contents of header 203 for the present discussion is that it contains two 32-bit IP addresses, one of which, DEST IPA 207, specifies a destination in the Internet to which IP packet 201 is to be delivered, and the other of which, SRC IPA 209, specifies the source in the Internet of IP packet 201. Sources and destinations of Internet packets 201 are termed herein Internet hosts. An Internet host is an entity in a network which has an IP address and which is capable of responding to at least some of the protocols in the TCP/IP protocol suite. For details on IP addressing and the protocols of the TCP/IP protocol suite, see W. Richard Stevens, *TCP/IP Illustrated: The Protocols*, Addison-Wesley (1994), which is hereby incorporated by reference into this patent application.

The Internet is a logical network, not a physical network. IP packets 201 are transported across a variety of different physical networks. While an IP packet 201 is in a given physical network, it is transported in the same fashion that the physical network transports any kind of data. For example, one common kind of physical network is a LAN that uses the 10 base T protocol. One example of such a LAN is a LAN that uses the Ethernet® protocol developed by Xerox Corporation. In the Ethernet protocol, data moves in packets call frames. Each frame has a preamble 213, a destination Ethernet address 215, a source Ethernet address 217, an ethertype field 219, which specifies a type of the protocol, a data field 221, which carries the data, and a frame check sequence 223, which is an error checking code. When an Ethernet frame 211 is carrying an IP packet 201, IP packet 201 simply occupies data field 201. It is worth pointing out here that the Ethernet protocol does not examine the contents of data 221. There may of course be many levels of protocols between an IP packet 201 and the physical medium upon which the IP packet is being transported. In the following, only the next level down from the IP level is of concern, and this level is generically termed the link level, with the addresses at the link level being termed link addresses. Thus, if the link level employs the Ethernet protocol, the link addresses are DA 215 and SA 217.

IP Addressing and Routing Architecture

The IP addressing and routing architecture of the cable data network defines how the IP addresses which are used to route IP packets (datagrams) in the Internet are mapped onto the networks which make up the cable data network's link level. The architecture has a number of fundamental principles:

- Each cable data network defines its own IP addressing domain, i.e., the network defines how IP addresses in a set of IP addresses which has been assigned to the cable data network are assigned to component devices in the cable data network;
- All devices in the cable data network which do routing or maintain data bases used in determining routes are IP hosts;
- Within the addressing domain, sets of IP addresses are assigned to hosts connected by a LAN to an RF modem, which is in turn connected to a CATV cable that is part of a network in the addressing domain. The RF modem functions as a router for packets addressed to the hosts connected to the LAN;
- IP routing in the networks consisting of portions of the cable network is hierarchical. An IP packet addressed to a host is first routed to the proper cable network, then captured by the host's RF modem and finally routed to the host by the RF modem; and
- The RF modem may receive IP packets addressed to its hosts from two independent link level networks: an RF link level network (for example, a CATV network) and a switched public telephone network. The RF modem may further route outgoing IP packets via the switched public telephone network.

Several advantages flow from these principles:

First, because all of the devices that do routing or maintain routing data bases are Internet hosts, IP address assignment, packet rerouting, and network management can be done using the standard DHCP, RIP, and SNMP TCP/IP protocols. For details, see the Stevens reference, supra.

Second, because the RF modem can receive packets addressed to its hosts not only via the RF link level, but also via the switched public telephone network, if the RF link fails, packets for the hosts can be simply rerouted to the RF modem via the switched public telephone network. Moreover, the rerouting can by done by means of the RIP TCP/IP protocol.

Third, packets sent to the RF modem via the switched public telephone network may be employed to tune the RF modem to a particular channel in the RF link, making it possible to dynamically assign a channel in the RF link to an RF modem. In effect, a link-level address in the RF link is dynamically assigned to the RF modem.

Fourth, because the cable data network can assign its own IP addresses, a mixed static-dynamic policy for assigning addresses may be pursued, with components that are constantly active having statically-assigned IP addresses and components that are intermittently active, such as the RF modems and the hosts attached to them, having dynamically-assigned IP addresses that are assigned at the beginning of activity by the component and are deassigned at the end of activity.

Fifth, the dynamic assignment of IP addresses to RF modems and their hosts makes it possible to share a small number of IP addresses among a much larger group of users. Moreover, the dynamic assignment of TP addresses can be done by means of the DHCP TCP/IP protocol.

Sixth, the dynamic assignment of IP addresses to RF modems also makes it possible to share a small number of addresses in the RF link among a much larger group of RF modems.

Seventh, network management can be done by means of the SNMP TCP/IP protocol.

Finally, the number of IP addresses required in the network is further reduced by giving the RF modems a reusable IP address for use inside the LAN to which a given RF modem's hosts are attached.

Physical Components of the Cable Data Network

Figure 3:
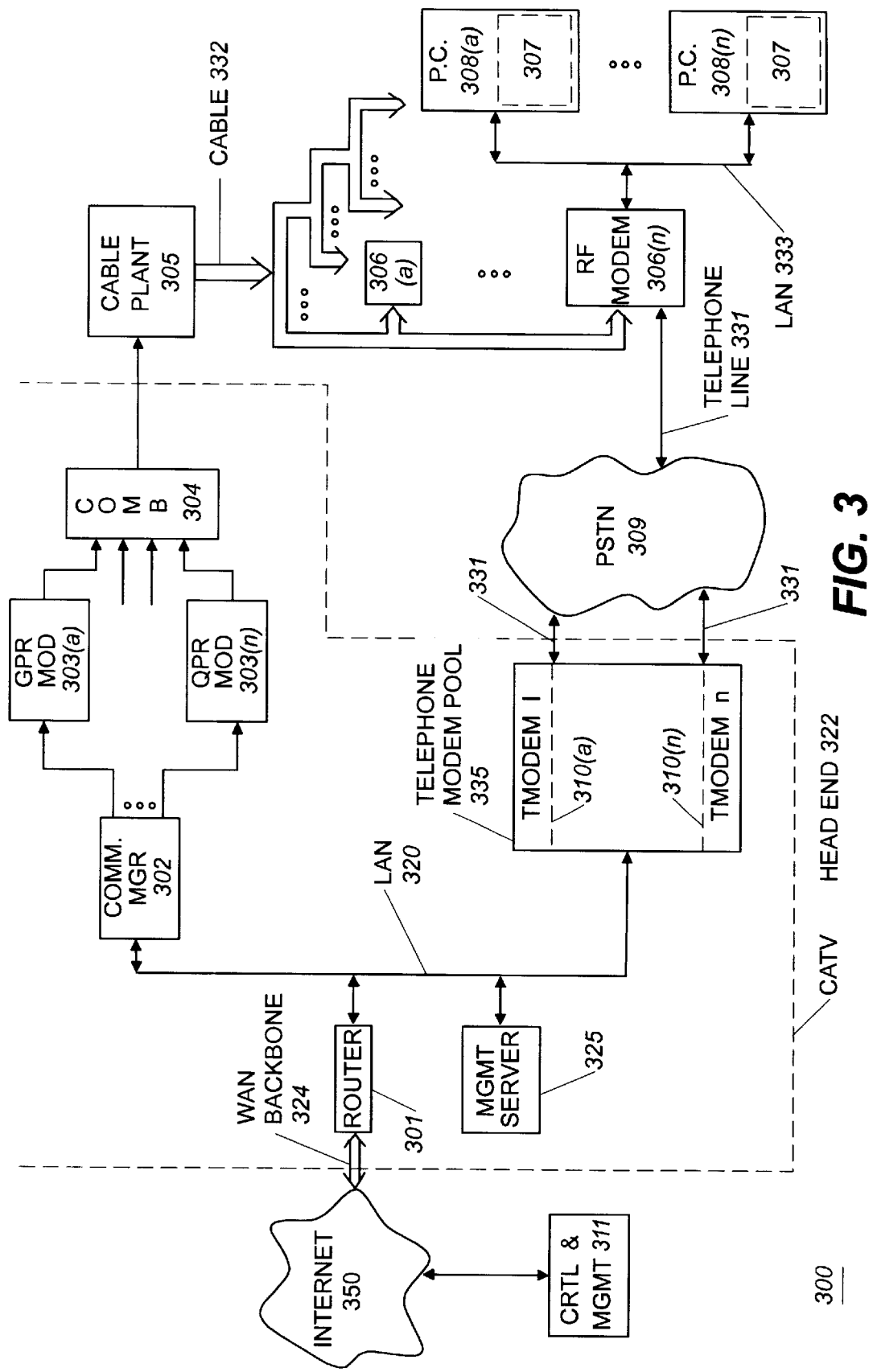
FIG. 3 illustrates a schematic block diagram of a cable data network in a preferred embodiment.

Referring to FIG. 3, there is shown the physical components of cable data network 300 in a preferred embodiment. In a preferred embodiment, cable data network 300 is implemented in a cable television (CATV) system. An advantage of the preferred embodiment is that it provides a protected radio frequency link as the connecting link between a service provider and an Internet subscriber. The protected radio frequency link provides forward error correction for the data link layer blocks (packet blocks) of an IP packet or datagram which protects the final link from the service provider to a cable modem and, in turn, protects the link to the Internet subscriber. In particular, forward error correction of each packet block is performed using forward error correction redundancy to enhance performance in the presence of channel impairment. The protected radio frequency link replaces and overcomes the drawbacks of the usually noise intensive and destructive telephone line connecting the service provider and the Internet subscriber.

Cable data network 300 transfers data packets with IP addresses between Internet 350 and hosts 308, which in a preferred embodiment is a P.C. or work station. Cable data network 300 also transfers packets with IP addresses among the components of cable data network 300 and uses Internet 350 to exchange data packets with IP addresses between cable data network 300 and remotely-located control and management components 311. These components typically deal with functions such as receiving information about new subscribers or billing.

Packets from Internet 350 that contain the IP address of a host 308(*i*) are received in CATV head end 322, are put in the proper form for transmittal over cable 332 belonging to the CATV system, and are transmitted via cable 332 to RF modem 306(j) to which destination host 308(i) is attached. RF modem 306(j) reads the IP address of host 308 from the packet and routes the packet to host 308(i). Packets from host 308(i) which are intended for a destination in Internet 350 go to RF modem 306(j), which routes them via telephone line 331 and public switched telephone network ("PSTN") 309 to a telephone modem ("Tmodem") 310(k) in telephone modem pool 335 in head end 322. Tmodem 310(k) routes the packet to router 301, which routes it to internet 350. Since PSTN 309 allows bidirectional communication, router 301 may also route packets received from Internet 350 to host 308(i) via tmodem 310(k) and RF modem 306(j). As will be explained in more detail in the following, this route is used in the event of a failure in the CATV portion of network 300.

Continuing with the details of the implementation of cable data network 300, data packets are transferred between Internet 350 and CATV head end 322 by means of a transmission medium belonging to a wide-area network ("WAN") backbone 324. Typically, the transmission medium will be a high-speed, high-capacity fiber optic cable such as a T1 or T3 cable, but it could also be a terrestrial or satellite microwave link. The transmission medium is connected to router 301, which in a preferred embodiment may be a router belonging to the 7000 series manufactured by Cisco Systems, Inc., San Jose, Calif.

Router 301 is coupled between WAN backbone 324 and LAN 320, which is the link-level network that connects the components of cable data network 300 which are located in CATV head end 322. Router 301 may both receive packets from WAN backbone 324 or LAN 320 and provide them to WAN backbone 324 or LAN 320. Each component connected to LAN 320 has both an IP address and a LAN address on LAN 320, and router 301 contains a routing table which it uses to route IP packets to IP hosts, including other routers. Router 301 examines every packet it receives on WAN backbone 324 or LAN 320; if the packet's destination IP address is one of the ones in the routing table, router 301 routes it to the component on LAN 320 which is to receive packets having that IP address; if it is not one of the addresses in the routing table, router 301 routes it to WAN backbone 324, which takes it to Internet 350. In each case, router 301 puts the data packet into the proper form to be transmitted via the relevant link-level network.

As will be apparent from the foregoing discussion, LAN 320 and router 301 can be used to route IP packets received from Internet 350 and destined to a host 308 via two routes. The first route is via communications manager 302, cable plant 305, cable 332, and RF modem 306. The second route is to host 308 via telephone modem pool 335 and RF modem 306. Packets from host 308 and from RF modem 306 are sent upstream via telephone modem pool 335 and LAN 320 to router 301. In other embodiments, it may also be possible to route packets addressed to RF modem 306 via the first route. Router 301 can finally route packets via Internet 350 between the components in head end 322, hosts 308, RF modems 306, and control and management components 311.

Figure 4:
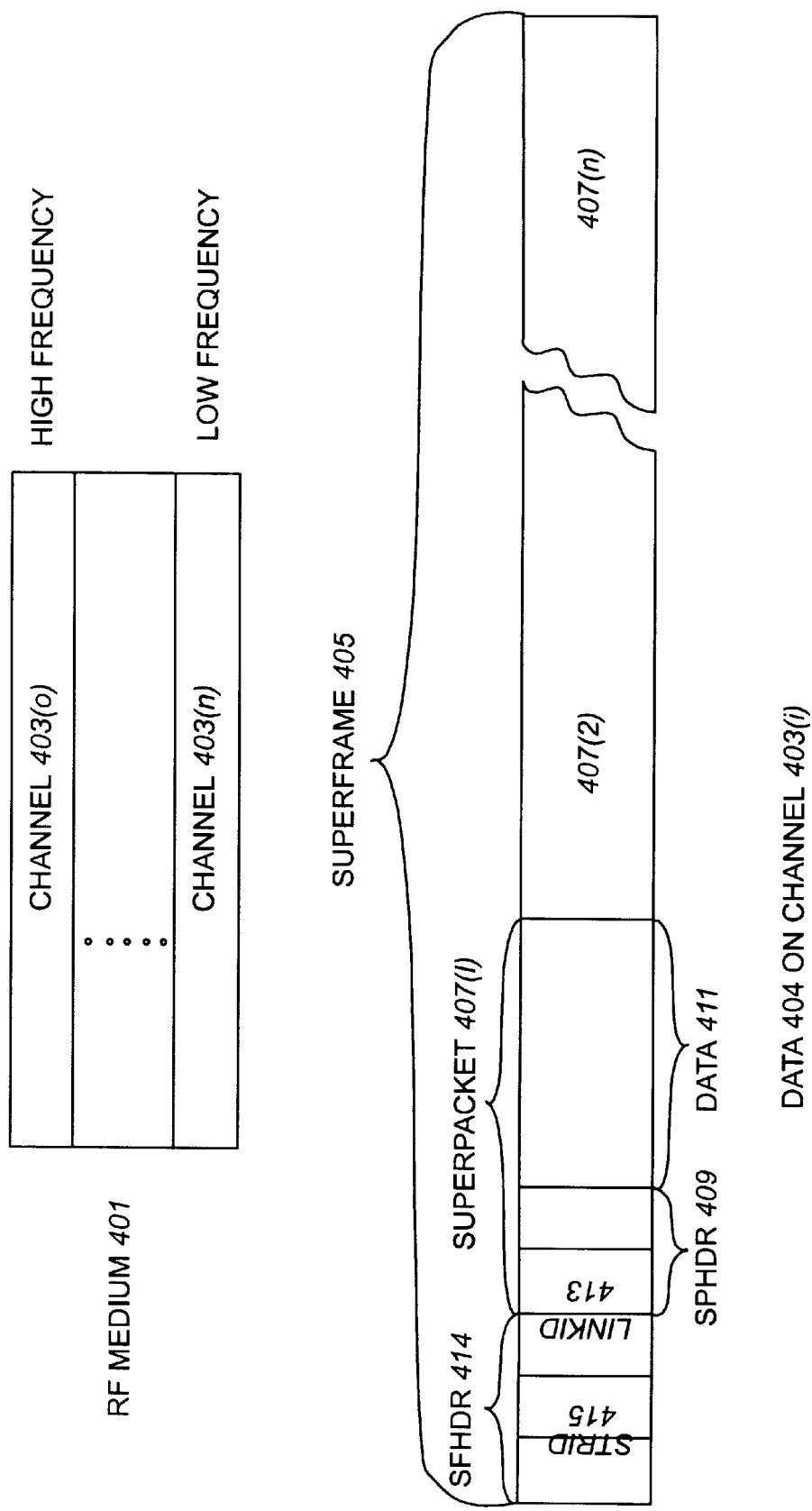
FIG. 4 provides details of how data is transported in the cable distribution plant 305 of FIG. 3.

When packets are to go to a host 308 via cable 332, they are routed to communications manager 302, which puts the packets into the proper form for transport by that link-level network. FIG. 4 shows how data is transported on cable 332 in a preferred embodiment. Cable 332 is an RF medium 401 which carries data in a fixed number of channels 403. Each channel 403 occupies a portion of the range of frequencies transported by cable 332. Within a channel 403(i), data moves in superframes 405. Each superframes contains a superframe header 414 and a fixed number of fixed-sized superpackets 407. The only portion of the superframe header that is important to the present discussion is stream identifier ("STRID") 415, which is a unique identifier for the stream of data carried on channel 403. The combination of a channel's frequency and the STRID 415 uniquely identifies the network to which cable 332 belongs in the CATV system. As will be explained in more detail later, this unique identification that the network cable 332 belongs to is used by communications manager 302 to determine which network should receive the IP packets intended for hosts 308 connected to a given RF modem 306(j).

Each superpacket 407 contains a header 409 and data 411. The header 409 contains a link identifier (LinkID) 413 in cable network 332 for an RF modem 306. The number of superpackets 407 is the number of pipes in channel 403(i). When a given RF modem 306(j) is active, it is associated with a <channel,pipe,LinkID> triple, that is, the RF modem 306(j) is tuned to the channel 403(i) specified in the triple and watches the superpackets that belong to the pipe specified in the triple. For example, if the RF modem is associated with pipe 3, it watches superpacket 407(3) in superframe 405, and if superpacket 407(3)'s header 409 contains RF modem 306(j)'s LinkID 413, then RF modem 306(j) reads data 411 from superpacket 407(3). The <chanel,pipe, LinkID> triple is thus the link address of RF modem 306(j) on cable 332. Data 411 is of course all or part of an IP packet 201. If the IP address of packet 201 specifies a host 308 connected to RF modem 306(j), the RF modem 306(j) routes it to that host 308.

Returning to communications manager 302, that component receives IP packets 201 addressed to hosts 308 connected to networks whose link layers are cables 332 connected to head end 322 and routes them to the proper RF modems 306 for the hosts 308. It does this by relating the IP address of an active host 308 to one of the networks and within the network to a <channel,pipe,LinkID> triple specifying the RF modem 306 to which the host 308 is connected. As employed in the present context, an active host in one that currently has an IP address assigned to it. Using the information in the routing table, communications manager 302 makes superframes 405 for each channel 403(i) in the network containing cable 332. The superframes contain superpackets 407 directed to the RF modems 306 connected to that channel for which communications manager 302 has received IP packets 201. The superframes are stored in a dual-ported memory which is accessible to QPR modulators 303.

There is a QPR modulator 303 for each channel 403 in a given network, and the QPR modulator reads the superframes for its channel, digitally modulates the RF signal for the channel according to the contents of the superframes, and outputs the modulated signal to combiner 304, which combines the outputs from all QPR modulators and provides the combined output to cable plant 305, which outputs it to cables 332 belonging to the network. The QPR modulators employ quadrature partial response modulation. Of course, any kind of digital RF frequency modulation could be employed as well. It should also be pointed out that any arrangement could be employed which relates a given RF modem 306 to a portion of the bandwidth of the network to which cable 332 belongs, rather than the <channel,pipe, LinkID> triple used in the preferred embodiment, and that the portion of the bandwidth that carries packets addressed to hosts 308 connected to a given RF modem 306 can be termed in a broad sense the RF modem's "channel".

Figure 5:
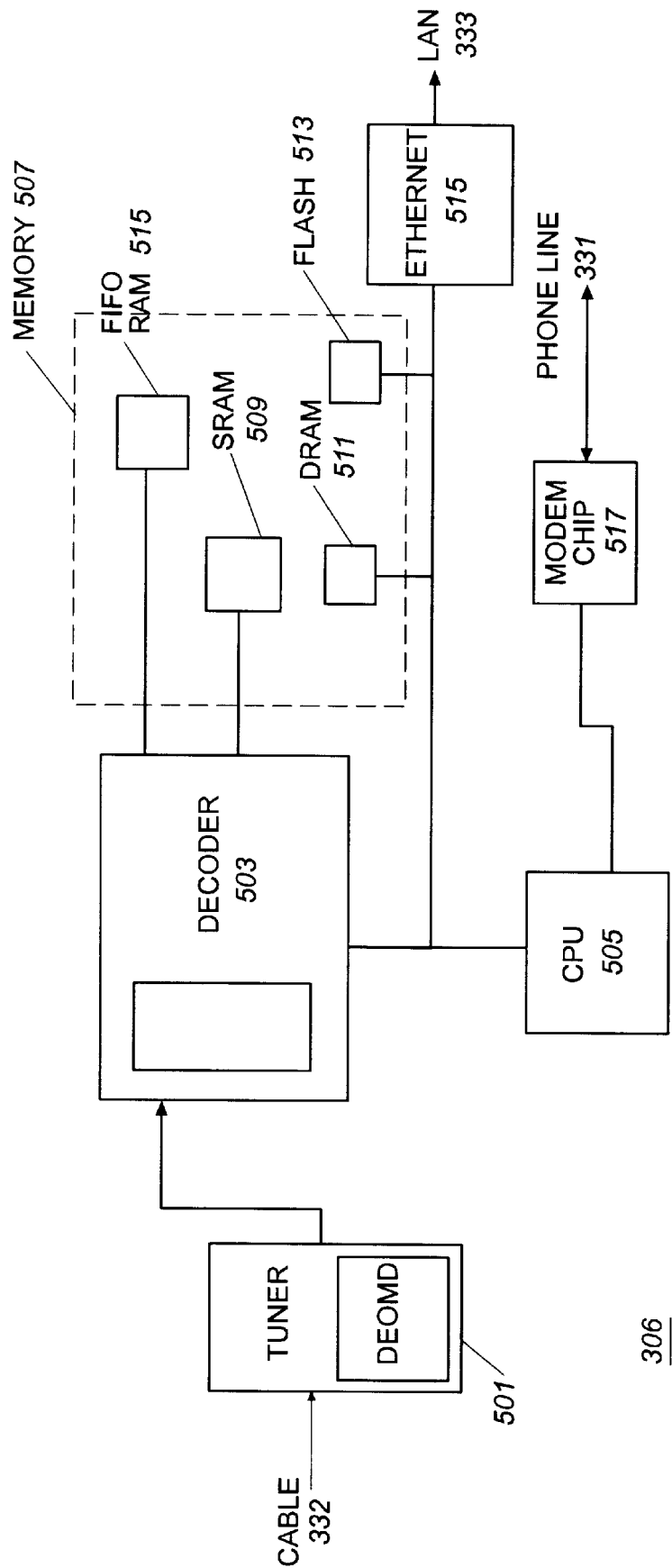
FIG. 5 illustrates a schematic block diagram of an RF modem in a preferred embodiment.

Referring now to FIG. 5, there is shown a block diagram of a preferred embodiment of an RF modem 306. The components of RF modem 306 operate under control of CPU 505 and read data from and write data to memory 507, which has four kinds of memory components: NVRAM 509, which is nonvolatile, that is, it is writable but retains its contents when RF modem 306 is turned off, dynamic RAM 511, which is volatile, FLASH RAM 513, which is nonvolatile and writable but will only permit a fixed number of writes, and FIFO RAM 515. NVRAM 509 is used to store data which changes but must be kept across activations of RF modem 306. Examples of such data are the RF modem's serial number and Ethernet address. DRAM 511 is used for data that is only valid during an activation, such as the current routing table. FLASH RAM 513 is used for information that changes only rarely, such as the programs executed by CPU 505. In the preferred embodiment, RF modem 306 can load programs it receives in IP packets via cable 332 or telephone line 331 into FLASH RAM 513. FIFO RAM 515 is further described herein.

Turning to the interfaces and beginning with the interface to cable 332, that interface has two main components, tuner 501 and decoder 503. Tuner 501 can be tuned under control of CPU 505 to a channel 403(i) in cable 332. Tuner 501 further demodulates the superframes 405 it receives on that channel and passes them to decoder 503. Decoder 503 examines superpacket 407(i) for the pipe which carries data addressed to RF modem 306, and if LinkID 413 in superpacket 407(i) specifies RF modem 306, decoder 503 decodes the data and passes it to memory 507.

The decoder 503 further determines whether the superpacket 407(i) contains errors, for example, as a result of burst errors in the transportation of the superframe 405. The decoder 503 places error free packet blocks of the superpacket 407(i) in a Packet FIFO (RAM) 515 and error packet blocks of the superpacket 407(i) in a Fixit FIFO (RAM) 515. The CPU determines when a complete packet block has been placed in a FIFO. If a packet block has been placed in the Packet FIFO, then the CPU will remove blocks from the Packet FIFO and based on a sequence number encoded the packet block, the CPU will place the block at a location in the IP datagram to be reconstructed. If an error packet block was placed in the Fixit FIFO, then the CPU will attempt to fix the error packet block by using BCH error-correcting code included in the packet block. If the packet block has errors that are uncorrectable from the BCH error-correcting code, then no more packet or fixit blocks will be processed until the packet block with a sequence number of zero is recieved indicating a new IP datagram. If all the packet blocks are correctable and a complete IP datagram is received, the next layer of the protocol stack, e.g., the Ethernet protocol, is notified to process the data. As a result, this minimizes CPU resources and maximizes memory utilization in the RF modem.

Each packet block is stored in the FIFO as follows:

| Byte | Description |
| --- | --- |
| 0 | Bits 0–7 of sequence number |
| 1 | Bits 8–15 of sequence number |
| 2 | Bit 7 -- Packet size (12 or 26 bytes of payload), Bits 4–0 - Bits 16–21 of sequence number |
| 3–28 | Packet data |

-continued

| Byte | Description |
| --- | --- |
| 29 | BCH syndrome 1 (only for fixit FIFO) |
| 30 | BCH syndrome 3 (only for fixit FIFO) |
| 31 | Bit 0 - Overall parity (only for fixit FIFO) |

Figure 6A:
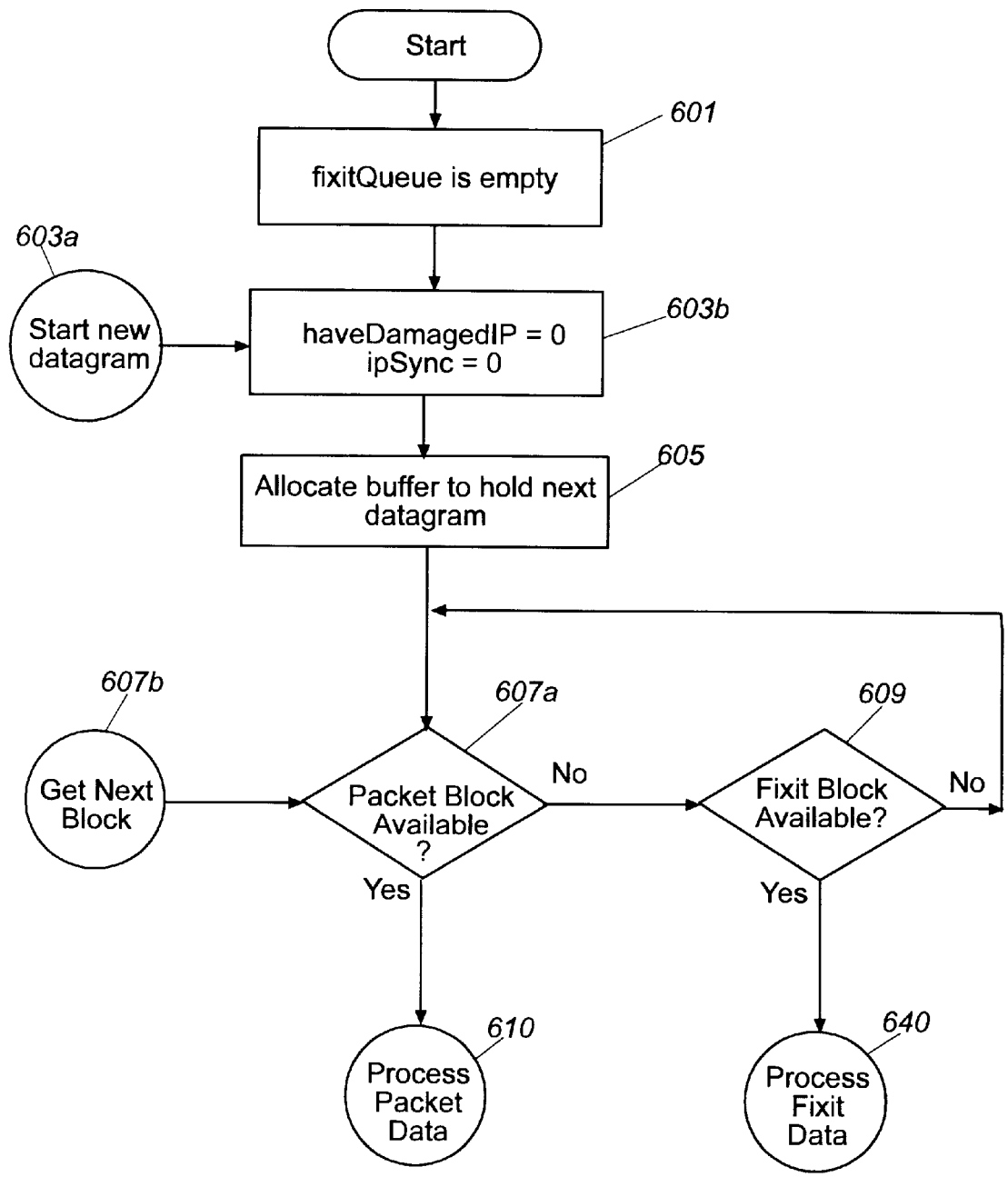
FIG. 6 illustrates a flowchart describing the IP datagram reconstruction algorithm.
Figure 6B:
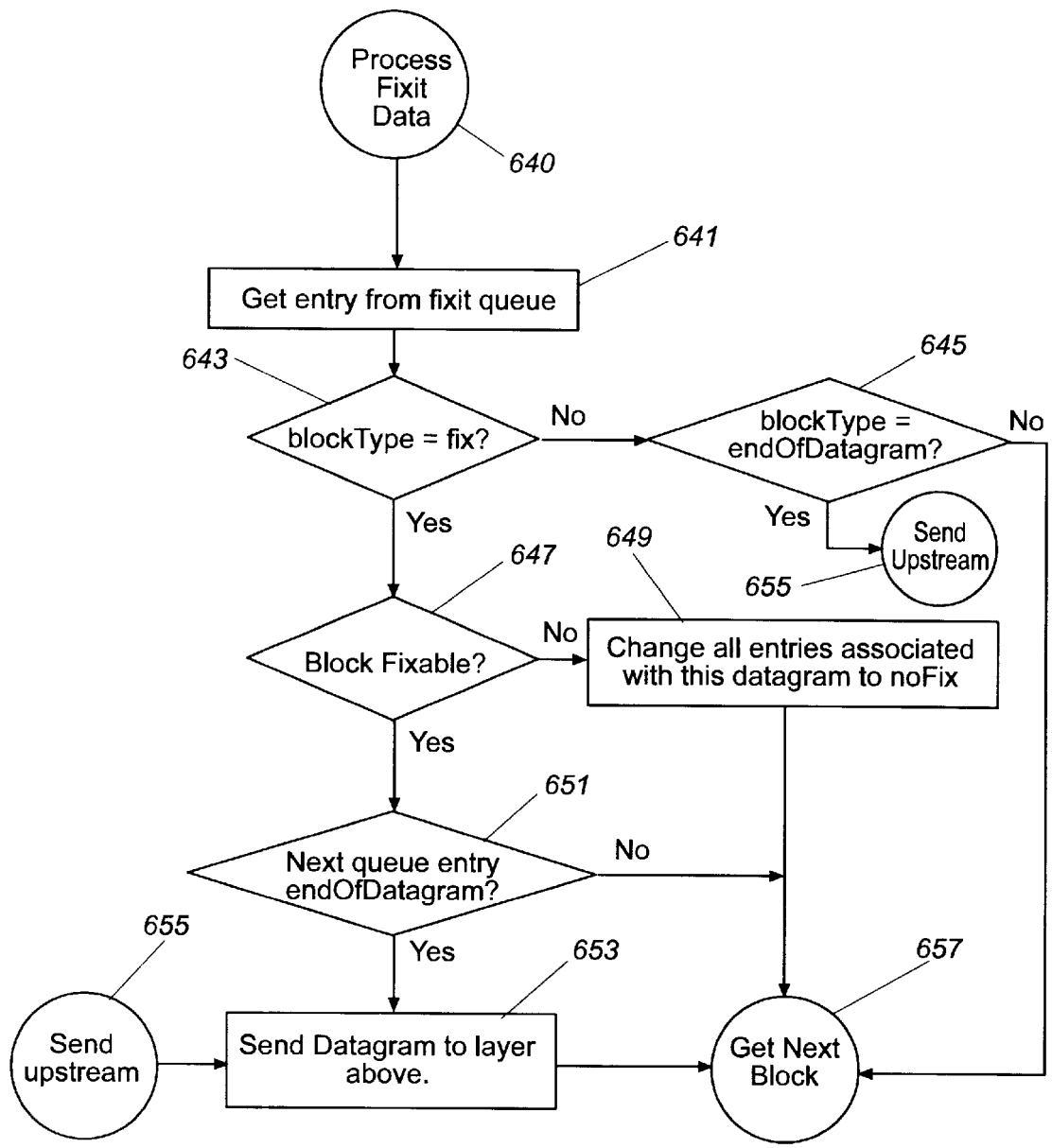
Figure 6C:
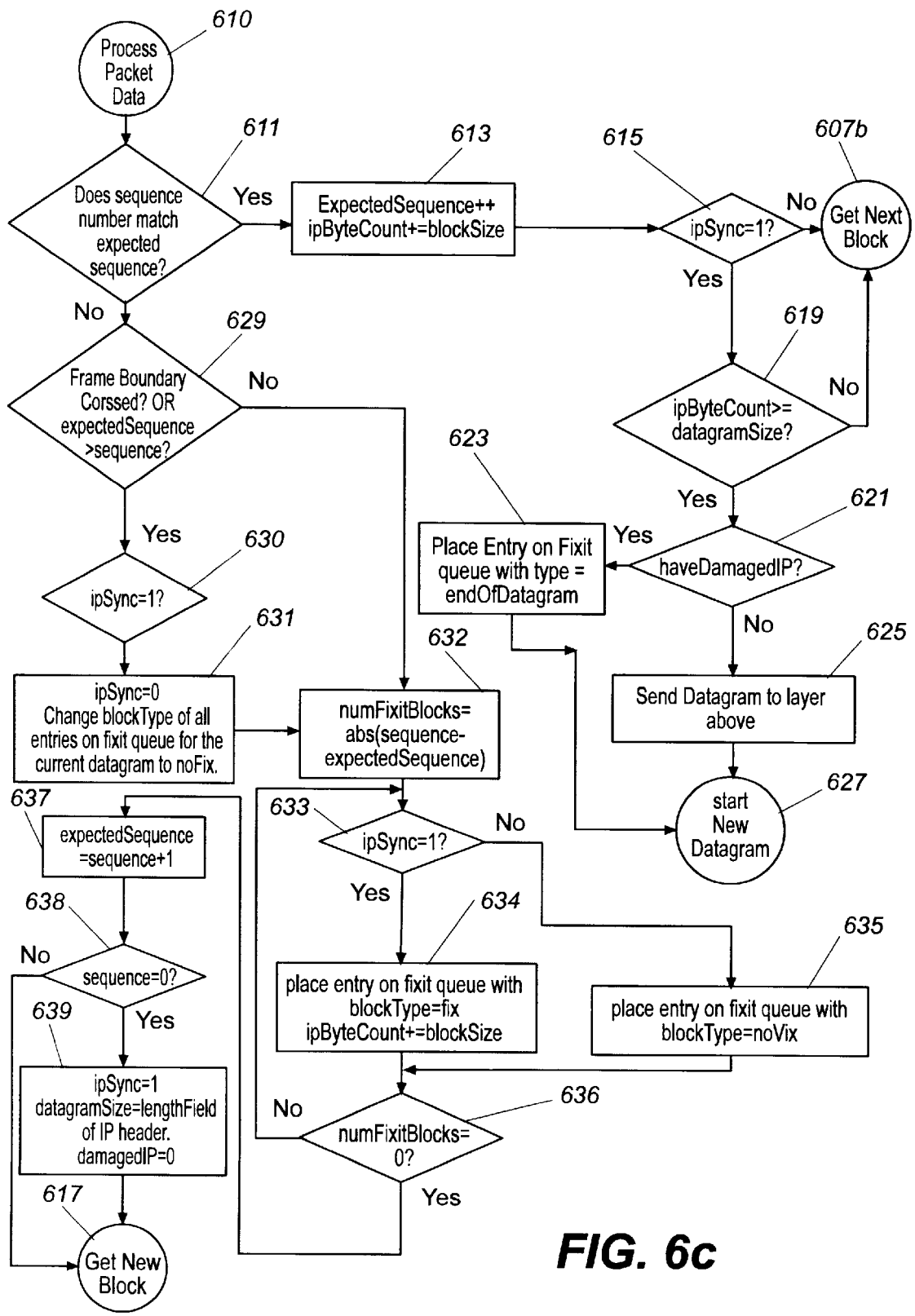

Referring to FIG. 6, there is shown a flowchart describing the IP datagram reconstruction algorithm in accordance with the teachings of the present invention. As stated above, IP datagrams are reconstructed from smaller packet blocks of data which contain forward error-correcting information, and these packet blocks can possibly b e corrected by the CPU 505 using, for example, the BCH error-correcting code. Packet blocks of data received from the decoder 503 are either good data (Packet Block), or data to correct error data (Fixit Block). A sequence number is sent with each packet block from the cable head end and based on this sequence number, it can be determined where to place the current block in reconstructing the IP datagram or whether a packet block is missing from a superpacket (the packet data). For example, if the sequence number is out of sequence, then it is assumed that the block is a fixit block and is sent to the Fixit FIFO. If the sequence number is wrong, then it is assumed that a block of data is missing from the superpacket, and the number of missing packet blocks is calculated and entries are placed on a fixit queue with a type instructing the CPU 505 to either fix or not to fix the missing packet block(s), depending on whether the packet block(s) are fixable. A sequence number of zero means that the packet block is the start of a new IP datagram.

When a block of it data (fixit block) arrives from the decoder 503, an entry is placed in the fixit queue instructing the CPU 505 whether to fix the errored packet block or not, and where to place the fixit block if necessary. If the entry has a blockType of noFix, then no further action is taken. If the entry has a blockType of fix, then the CPU 505 attempts to fix the errored packet block. If the packet block is fixable, then the CPU places the fixit block in the correct location in the IP datagram as referenced by the queue entry. If the errored packet block is not fixable, then the CPU will change any other queue entries referencing the same IP datagram to noFix and, thus, not waste the CPU bandwidth fixing errored packet blocks from an irreparably damaged IP datagram. If the entry has a blockType of endOfDatagram, then this means that a packet receiver has received the entire IP datagram. The IP datagram is then forwarded to the protocol layer above it.

The flowchart of FIG. 6 is now described. Beginning at step 601, the fixit queue is cleared and in step 603b, the internal flags haveDamagedIP and ipSynch are cleared. Then in step 605, a buffer to hold the IP datagram to be reconstructed is allocated. A loop is then entered in steps 607 and 609 checking to see if a fixit or packet block has been received. If a packet block is available, then the method proceeds to step 610 for processing the packet data. If a fixit block is available, then the method proceeds to step 640 to process the fixit data, else return to the top of the loop at step 607a.

Referring now to step 610, step 610 begins the processing of packet data in accordance with the method of the present invention. First, the method determines whether the sequence number in the packet block matches the expected sequence number in step 611. If the sequence number matches the expected sequence number, then the ipByteCount is incremented by the size of the block. Next a test is performed in step 615 to determine if the RF modem has ipSynch. The RF Modem has ipSync if ipSync has a value of one, and if this is the case, then the method tests to see if the ipByteCount is greater than or equal to the datagram size. If ipSync does not have a value of one, then the method returns to the main loop in step 607b and waits for the next block of data. If the ipByteCount was long enough in step 619, then a test is performed in step 621 to determine if there is any damage blocks (haveDamagedIP). If there is no damage blocks, then the IP datagram is sent to the next layer of the protocol stack in step 625. Steps 627 and 603 are then used to set up for the next IP datagram.

Referring back to step 621, if there had been damaged blocks (haveDamagedIP), then an entry is placed on the fixit queue with a type equal to endOfDatagram and it is sent up to the fixit routine to send the IP datagram to the next protocol layer. Steps 627 and 603 are then used to set up for the next IP datagram.

Referring back to step 611, if the sequence number does not match the expected sequence number, then proceed to step 629 to determine whether a Frame Boundary has been crossed or the expected sequence number is greater than the sequence number. If either a Frame Boundary has been crossed or the expected sequence number is greater than the sequence number, then there is no hope of reconstructing the IP datagram. So if there was ipSync (ipSync has a value of one), then that flag is cleared in step 631 and all entries on the fixit queue for the current IP datagram are changed to a type of noFix. Then, regardless of whether ipSync was set, the number of missed blocks are calculated at step 632 and a loop is entered in steps 633, 634, 635, and 636 placing new entries on the fixit queue with a type offix if ipSync is set, or noFix if ipSync is not set. The method then proceeds to step 632 where the expectedsequence number is set to the current sequence number +1. Then in step 638, a check is performed for the sequence number having a value of zero, which means the current block is the start of a new IP datagram. If the sequence number has a value of zero, then load the IP datagramSize with the lengthField of the IP header, which is contained in the current block, set ipSync to 1, and clear the haveDamagedIP flag in step 639. Then proceed to step 617, return to the loop, and get the next block.

Referring now to step 640, step 640 begins the processing of fixit data in accordance with the method of the present invention. First, an entry from the fixit queue is retrieved in step 641. Next, determine whether the blockType is fix in step 643. If the blockType is not fix, then go to step 645 to determine whether the blockType=endOfDatagram. If the blockType is endOfDatagram, then send the Fixit Block to the next layer in the protocol stack as shown in step 655. If the blockType is not endOfDatagram, then return to the main loop to get the next block as shown in step 657. Referring back to step 643, if the blockType is fix, then determine whether the block is fixable as shown in block 647. If the block is not fixable, then change all entries associated with the IP datagram to noFix as shown in step 649. If the block is fixable, then determine whether the next queue entry is endOfDatagram as shown in step 651. If the next queue entry is not endOfDatagram, then return to the main loop to get the next block as shown in step 657. If the next queue entry is endOfDatagram, then send the IP datagram upstream to the next layer protocol stack, respectively.

Referring back to FIG. 5, when an IP packet has accumulated in memory 507, CPU 505 examines the destination IP address in the packet, and uses a routing table in memory 507 to determine whether the packet is addressed to a host 308 connected to RF modem 306. If the packet is so addressed, CPU 505 obtains the LAN address corresponding to the IP address. CPU 505 provides the LAN address and the location of the packet in memory 507 to Ethernet integrated circuit 515, which packages the packet into one or more Ethernet frames and outputs it to Ethernet 333.

RF modem may also receive IP packets via phone line 331 and modem chip 517 that are addressed either to the RF modem 306 itself or to one of the hosts 308 connected to RF modem 306. In the first case, RF modem 306 responds to the packet; in the second, it routes the packet to the host as just described for packets from cable 332. When RF modem 306 receives a packet via LAN 333 that is not addressed to RF modem 306 itself, the RF modem 306 routes the packet via modem chip 517 and telephone line 331. Included in host 308 is the software 307 necessary to interact with RF modem 306.

Continuing with the portion of the link level that is implemented using the public switched telephone network, modem chip 517 in RF modem 306 is connected by means of a standard analog telephone line 331 to PSTN 309, and RF modem 306 can thus call other telephone numbers via PSTN 309 and be called from other telephone numbers in PSTN 309. In the present case, when RF modem 306 wishes to set up a session that will permit it to transfer IP packets 201 for a host 308, it calls a telephone number for telephone modem pool 335. The modem pool responds by assigning a telephone modem (Tmodem) 310 to RF modem 306 and assigning RF modem 306 an IP address. As shown in FIG. 3, telephone modem pool 335 is also connected to LAN 320 in head end 322. Telephone modem pool 335 serves as a router with respect to LAN 320 and the telephone connections currently being served as by the tmodems 310 in the modem pool. Once a telephone modem 310 and an IP address have been assigned to RF modem 306, RF modem 306 may send IP packets 201 to the devices connected to LAN 320 and receive IP packets 201 from those devices.

As will be explained in more detail herein, the fact that PSTN 309 provides a bi-directional link between the devices connected to LAN 320 and RF modem 306 is employed to determine where RF modem 306 is in the cable network managed by head end 322, to dynamically assign a <channel,pipe,LinkID> triple in cable 332 to RF modem 306, and to provide an alternate route to hosts 308 connected to RF modem 306 when there is a failure in the RF link between head end 322 and RF modem 306.

The remaining device which is connected to LAN 320 is control/management server 325, which in a preferred embodiment is implemented in software executing on a server constructed by SUN Microsystems, Inc., Mountain View, Calif. Control/management server 325 manages the cable data network ("CDN") 300. It responds to DHCP packets by dynamically allocating IP addresses to hosts 308 and sending SNMP packets to router 301 and communications manager 302 which cause them to set their routing tables as required for the newly-assigned IP address, responds to SNMP trap packets from the devices connected to LAN 320 and from RF modems 306, responds to RIP packets as required to update routings, and maintains the Management Information Database used by the SNMP protocol as well as a list of unassigned IP addresses. A graphical user interface in control/management server 325 shows the current status of CDN 300 and permits operator intervention in the operation of cable data network 300.

IP Addressing Architecture of CDN 300

Figure 7:
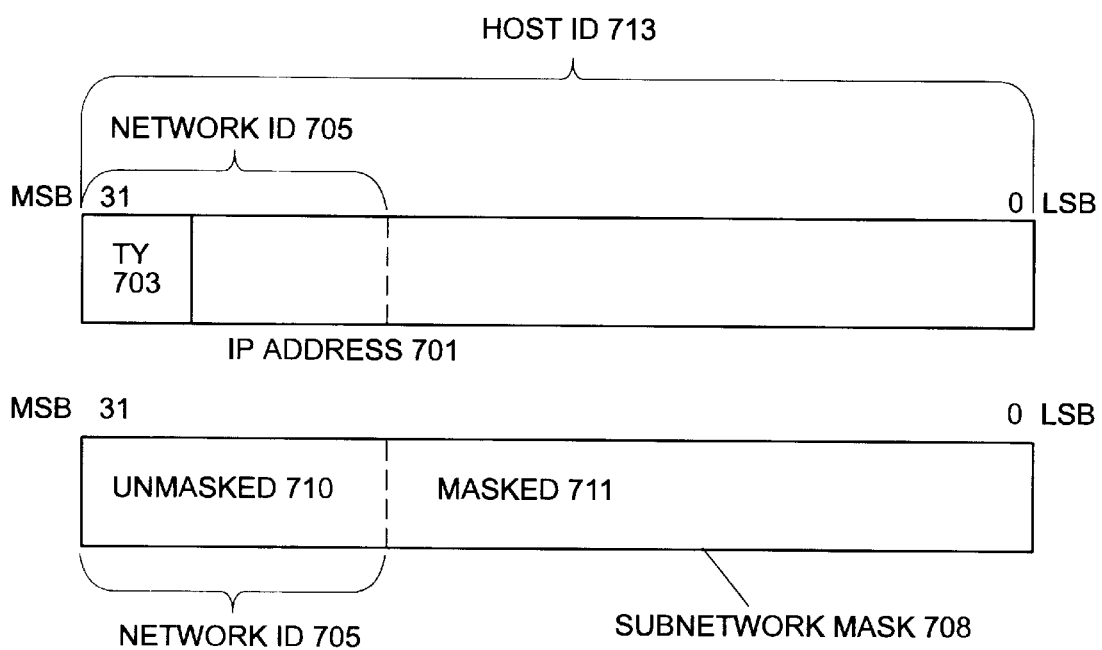
FIG. 7 illustrates a 32-bit IP address for identifying hosts in a cable data network.

CDN 300 maintains its own IP address domain. The proprietors of CDN 300 receive a set of 32-bit IP addresses and can apply those addresses to devices connected to CDN 300 as they see fit. FIG. 7 shows 32-bit IP address 701. The 32 bits are divided into two fields: type field 703, which defines the type of IP address 701 and host ID field 713, which identifies a specific host 108. The host IDs are organized into sets of IDs for the networks in the address domain. This is done by means of a technique called classless interdomain routing ("CIDR"). In this technique, the entire address is a host ID 713 that identifies an individual host; some number of the least significant bits of the host IP address are designated to specify a given network belonging to the domain; these bits are the same for all IP addresses in the given network and make up network ID 705.

Packets with IP addresses that have been assigned using the CIDR technique are routed by means of subnetwork masks. A subnetwork mask 708 is a 32-bit string of bits that is used to mask an IP address, that is, to select that part of the IP address that is currently relevant to the routing process. For example, if the IP address is being routed to the network it belongs to, the only part of the address that is relevant is the part that contains network ID 705. As shown in FIG. 7, in this case, unmasked part 710 selects the bits of network ID 705; masked part 711 hides the remaining bits of the IP address. Once the packet is in the network identified by network ID 705, the entire IP address is relevant and none of it is masked.

Using this technique, the proprietors of a domain of IP addresses can easily define the number of hosts in a network. In CDN 300, the bits of IP address 701 specified by the subnetwork mask that identifies network ID field 705 specify a portion of a metropolitan cable network (for example, a single cable 332, a single cable plant 305 and the cables radiating from it, or even a single head end 322 and the cables 332 served by it). Host ID field 713 identifies one of the hosts 308 in the network identified by network ID field 705. As one would expect from the fact that CDN 300 has a relatively small number of CATV cables, a relatively large number of RF modems 306, and a relatively small number of hosts 308 per RF modem 306, the number of bits in network ID field 705 is comparatively small.

Comparison of addresses for routing purposes is done using subnetwork masks 708. The order in which an IP address being routed is compared to addresses in the routing table is by the unmasked length of the address in the routing table. Thus, the address being routed is compared first with addresses that are completely unmasked. For details, see Stevens, supra, pp. 7–9 and 140–141.

Figure 8:
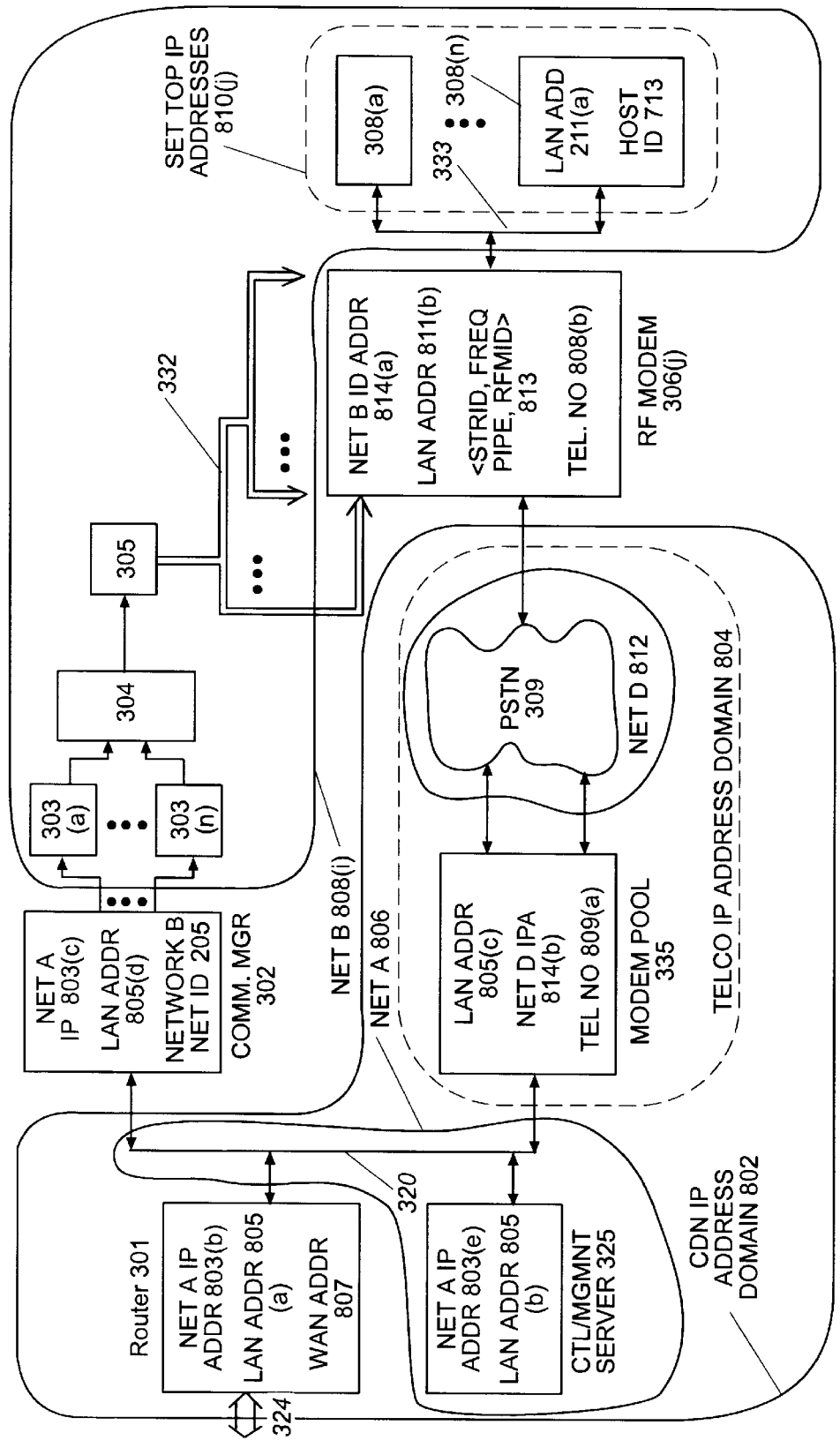
FIG. 8 illustrates a schematic block diagram of exemplary IP networks that exist in a cable data network.

FIG. 8 shows the IP networks that exist in the cable data network and how they relate to the link level networks. Each addressable component of the cable data network appears in FIG. 8 with the IP addresses and link level addresses that apply to it. As is the case with all IP networks, each host must have its own IP address and must have in addition the address of a gateway in the network to which it can send IP packets for routing. Only one set of the IP networks, namely networks B 808(0 . . . n) need belong to cable data network IP address domain 802, that is, the cable data network assigns the addresses from the set provided to it. In the preferred embodiment, networks A and D also belong to address domain 802. IP addresses in network A all have network A's NetID 705 and IP addresses in network B all have network B's NetID 705. The third IP network is network D 812. The router for this network is modem pool 335. In a preferred embodiment, the IP addresses in network D 812 are not visible outside cable data network 300. In other embodiments, the IP addresses in network D 812 may belong to another domain entirely, for example, one belonging to the telephone company that provides the modem pool.

Continuing with IP network A 806, this network has LAN 320 as its link level network. LAN 320 connects components of cable data network 300 that are always in use, and consequently, the IP addresses in network A 806 may be statically assigned. Routers with IP addresses in Net A are router 301, communications manager 302, and modem pool 335.

IP network B 808(i) may be one of several such networks, each of which will have its own statically-assigned NetID 705. Network B 808(i) has as its link layer one or more cables 332, to which RF modems 306 are connected. The router for network B 808(i) is communications manager 302. Each active RF modem 306(j) in network B 808(i) has a set of IP addresses 810(j) having network B 808(i)'s network ID 705 that are available to be assigned to hosts 308 connected to RF modem 306(j). An active RF modem 306 is one that has an active host 308 connected to it. Any IP address having the network ID for the network may belong to a given set 810(j). The link level network for each set of IP addresses 810(j) is the LAN 333 connecting the hosts 308 with RF modem 306(j). RF modem 306(j) serves as the router for that set of addresses. IP addresses of hosts 308 in network B 808(i) are dynamically assigned by control/management server 325. When RF modem 306(j) becomes active, control/management server 325 assigns modem 306(j) a set of IP addresses for the hosts 308 connected to RF modem 306(j). The IP addresses have the NetID 705 for network B 808(i) and as many host IDs 713 as are required for the hosts 308. As will be explained herein, every host 308 connected to an RF modem 306(j) has an IP address for RF modem 306(j). Cable data network 300 conserves IP addresses by giving every RF modem 306(j) on a network the same IP address on LAN 333 connecting hosts 308 to RF modem 306.

As indicated before, network D 812 uses hidden IP addresses belonging to the domain of CDN 300 in a preferred embodiment, but the IP addresses may also be provided by another party such as a telephone company. The link layer in this network is PSTN 309. When RF modem 306(j) dials into modem pool 335, modem pool 335 dynamically assigns RF modem 306(j) an IP address. Modem pool 335 also functions as the router in network D 812. Modem pool 335 routes incoming IP packets with RF modem 306(j)'s IP address via network D 812 to RF modem 306(j). When the RF link is inoperative, modem pool 335 also routes incoming packets with the IP addresses of the hosts 308 attached to RF modem 306(j) to RF modem 306(j), which routes them further to the hosts. Modem pool 335 additionally routes all outgoing packets received from RF modem 306(j) via LAN 320 to router 301.

Router 301 normally routes IP packets destined for network B to communications manager 302 and those destined for network D 812 to modem pool 335. If there is a failure in network B 808(i), router 301 can also route packets destined for a host 308 connected to RF modem 306(j) to RF modem 306(j) via network D 812.

FIG. 8 also shows the IP and link layer addresses by means of which the components of CDN 300 may be reached. Beginning with the components on Net A 806, router 301 has an IP address 803(b) of its own in Net A 806 and also has an address 805(a) on LAN 320 and an address 807 on WAN 324. Communications manager 302 has an IP address 803(c) of its own in Net A 806 and an address 805(d) on LAN 320. Router 301 also routes all packets to communications manager 302 that are to be carried via the networks B 808 specified in one or more NETID fields 705 in the IP addresses. Continuing with control/management server 325, that component has an IP address 803(*e*) in Net A 806 and a LAN address 805(*b*). Modem pool 335 has an IP address 814(*b*) in Net D 812, a LAN address 805(*c*), and a telephone number 809(*a*) in PSTN 109.

Continuing with network B 808(*i*), a given host 308(*k*) in a given subnetwork C 810(*j*) has a dynamically-assigned IP address. In the address, the host ID 713 specifies host 308(*k*) and the net ID 705 specifies network B 808(*i*). Each host also has a LAN address 811 in LAN 333. The most complex addressing situation is that of RF modem 306(*i*). RF modem 306(*i*) has an IP address 814 in network D 812, has a reusable IP address in LAN 333. At the link address level, RF modem 306(*j*) is addressed in cable 332 by a <channel, pipe,LinkID> triple, has a telephone number 808(*b*), and a LAN address 811(*b*) in LAN 333.

Accordingly, the present invention provides for, among other things, an effective and efficient method for detecting, correcting and discarding corrupted or incomplete IP packets in a cable data network.

While the invention has been described in detail with reference to a preferred embodiment and selected variations thereof, it should be apparent to those skilled in the art that many modifications and variations are possible without departure from the scope and spirit of this invention as defined in the appended claims.

What is claimed is:

1. A method for transporting digital data from a sender to a receiver in a system where the digital data is broken into data packets for transmission over radio frequency channels, each data packet including forward error-correcting code, the method comprising the steps of:

receiving the data packets at the receiver;

reconstructing the data packets to the digital data, said forward error-correcting code for fixing corrupted data packets; and halting the data packet reconstructing step if a data packet is uncorrectable.

2. The method of claim 1, wherein the data packets are modulated for transmission over the radio frequency channels.

3. The method of claim 2, wherein the receiving step further comprises the step of demodulating the data packets.

4. The method of claim 1, wherein the receiving step further comprises the step of tuning one of the radio frequency channels for reading the data packets.

5. The method of claim 3, wherein the tuning step further comprises the step of reading destination addresses of the data packets.

6. The method of claim 1, wherein the reconstructing step further comprises the step of decoding the data packets.

7. The method of claim 1, wherein the reconstructing step further comprises the step of determining whether the data packets contain errors.

8. The method of claim 7, wherein the determining step further comprises the steps of storing error free data packets in a packet FIFO and storing error data packets in a fixit FIFO.

9. The method of claim 8, wherein the reconstructing step further comprises the step of fixing error data packets by using said forward error-correcting code.

10. An apparatus for transporting digital data from a sender to a receiver in a system where the digital data is broken into data packets for transmission over radio frequency channels, each data packet including forward error-correcting code, the apparatus comprising:

a tuner for receiving the data packets at the receiver;

a decoder for reconstructing the data packets to the digital data, said forward error-correcting code for fixing corrupted data packets; and means for halting said decoder from reconstructing the data packets if a data packet is uncorrectable.

* * * * *

UNITED STATES PATENT AND TRADEMARK OFFICE
CERTIFICATE OF CORRECTION

PATENT NO : 6,052,819

DATED : APRIL 18, 2000

INVENTOR(S) : BARKER ET AL.

It is certified that error appears in the above-identified patent and that said Letters Patent is hereby corrected as shown below:

Column 6, Line 6, delete "can by done" and insert therefore --can be done--
Column 6, Line 25, delete "TP" and insert therefore --IP--
Column 8, Line 1, delete "superframes contains" and insert therefore --superframe contains--
Column 8, Line 40, delete "host in one" and insert therefore --host is one--
Column 9, Line 52, delete "recieved" and insert therefore --received--
Column 10, Line 34, delete "block of it" and insert therefore --block of fixit--
Column 11, Line 32, delete "offix" and insert therefore --of fix--
Column 11, Line 34, delete "expectedsequence" and insert therefore --expected sequence --
Column 13, Line 62, delete "Ball" and insert therefore --B all--
Column 15, Line 12, delete "306(i)" and insert therefore --306(j)--
Column 15, Line 13, delete "306(i)" and insert therefore --306(j)--
Column 16, Line 6, delete "claim 2" and insert therefore --claim 1--
Column 16, Line 7, delete "demodulating the data packets" and insert therefore --tuning one of the radio frequency channels for reading the data packets--
Column 16, Line 8, delete "claim 1, wherein the receiving step" and insert therefore --claim 2, wherein the receiving step--
Column 16, Line 9, delete "tuning one of the radio frequency channels for reading the data packets" and insert therefore --demodulating the data packets Signed and Sealed this Eighth Day of May, 2001

Attest:

NICHOLAS P. GODICI

Attesting Officer

Acting Director of the United States Patent and Trademark Office